United States Patent [19]

Hearn

[11] 4,382,478
[45] May 10, 1983

[54] GAS BOTTLE CONTENTS GAUGE

[76] Inventor: Geoffrey Hearn, 70 Redbridge La. West, Wanstead, London, England

[21] Appl. No.: 278,077

[22] Filed: Jun. 29, 1981

[30] Foreign Application Priority Data

Jun. 28, 1980 [GB] United Kingdom ............... 8021297

[51] Int. Cl.³ ...................... G01G 23/14; G01G 3/00
[52] U.S. Cl. .................................. 177/169; 177/225; 177/253
[58] Field of Search ............... 177/50, 169, 225, 232, 177/233, 245, 126, 127, 253; 73/296

[56] References Cited

U.S. PATENT DOCUMENTS

| | | | |
|---|---|---|---|
| 3,319,730 | 5/1967 | Cuddon-Fletcher | 177/232 |
| 3,353,615 | 11/1967 | Nekimken | 177/225 X |
| 3,967,578 | 7/1976 | Gallo | 177/50 X |
| 4,047,584 | 9/1977 | Daly | 177/211 X |
| 4,245,505 | 1/1981 | Baynes | 177/245 X |

FOREIGN PATENT DOCUMENTS

| | | | |
|---|---|---|---|
| 670571 | 12/1938 | Fed. Rep. of Germany | 73/296 |
| 688230 | 1/1940 | Fed. Rep. of Germany | 177/253 |

Primary Examiner—George H. Miller, Jr.
Attorney, Agent, or Firm—McGlew and Tuttle

[57] ABSTRACT

A gauge for assessing the content of releasable gas in a bottle of compressed or liquified gas, which gauge serves to determine the force required to cause the bottle to pivot about a point on its lower periphery, the weight of the content being assessed from the magnitude of said force. The gauge has a platform pivoted about a horizontal edge on a frame and is spring-urged upwardly so as to be suitable for positioning under the lower rim of a gas bottle at a point on the periphery thereof. This causes the bottle to pivot about a diametrically-opposed point on the bottle rim periphery, provided the spring exerts a sufficient force. The platform is connected to a pointer to cause the pointer to sweep across a scale provided on a part of the frame, dependent upon the movement of the platform. A screw-threaded adjuster is arranged to pre-load the spring, thereby to allow alignment of the pointer with a 'full' marking on the scale when the gauge is first positioned beneath a full gas bottle; thereafter the remaining content can be assessed by the instantaneous indication given by the pointer reading on the scale.

12 Claims, 7 Drawing Figures

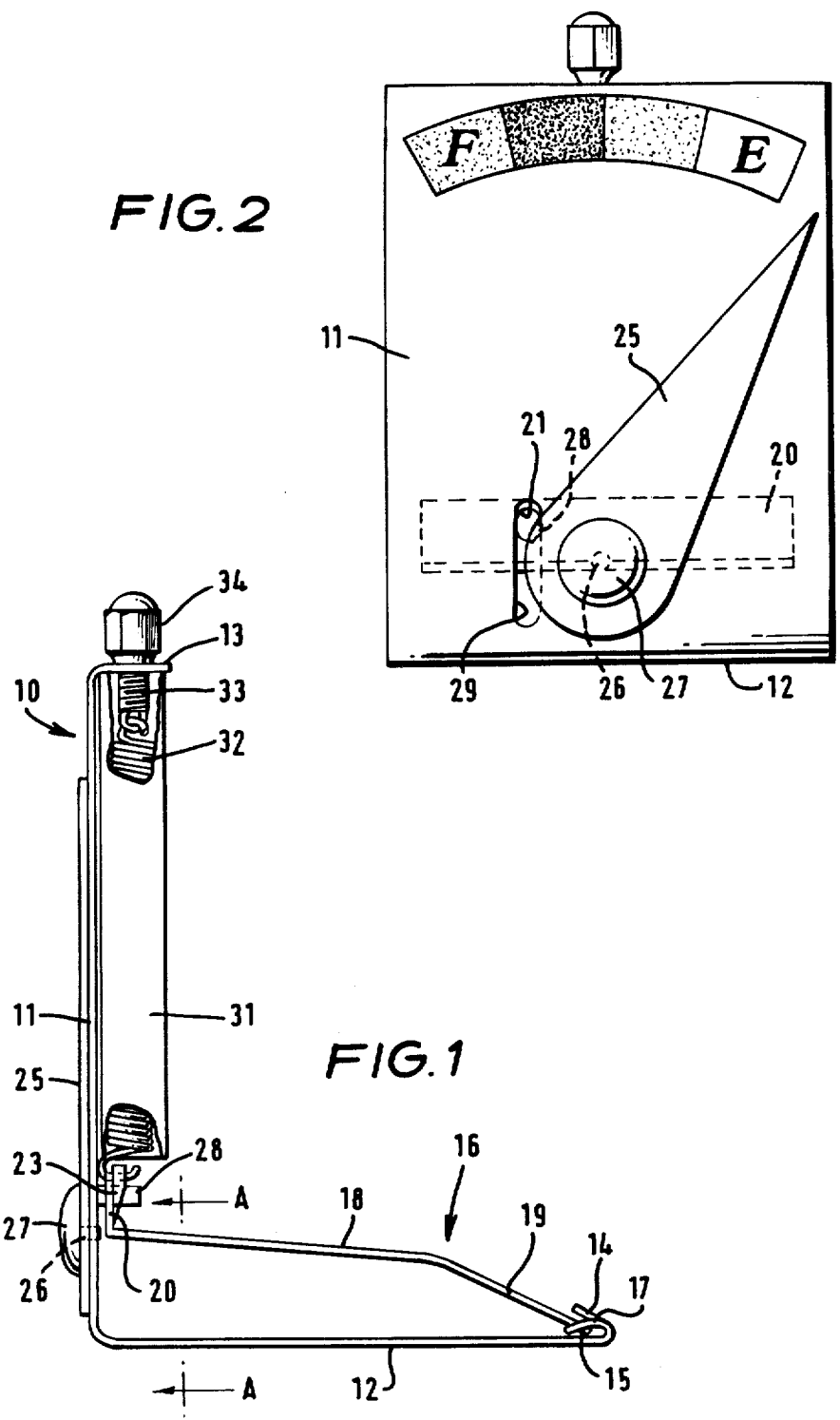

GAS BOTTLE CONTENTS GAUGE

BACKGROUND OF THE INVENTION (1) Field of the Invention

The present invention concerns the assessment of the amount of releasable gas in a gas bottle containing compressed gas. In particular, the invention relates to apparatus for assessing the amount of releasable gas in a bottle when resting on a support therefor, by causing pivoting movement of the gas bottle.

(11) Description of the Prior Art

Bottles containing compressed and liquified low molecular weight hydrocarbons such as butane, isobutane, propane and mixtures thereof are commonly used as a source of gaseous heating and/or cooking fuel in mobile accommodation such as caravans and boats, where it is not possible or viable to connect the mobile accommodation to a mains supply. Recently, portable gas fires have been developed for more general use, which use a gas bottle containing compressed gas, the fire having a housing which defines a holder for the gas bottle itself.

When a compressed gas is contained in liquified form in a gas bottle, it is not possible easily and reliably to measure the amount of fuel remaining as releasable gas simply by using a pressure gauge, since a pressure gauge can measure only the partial pressure of gas above the liquid gas in the bottle and the partial pressure depends to a large extent on the ambient temperature, rather than solely on the amount of fuel left in the bottle. Accordingly, it is not until there is very little or no liquid gas left in the bottle that a pressure gauge will register a significant pressure drop to show that the bottle is becoming empty. By that time, however, there will be only a small amount of releasable gas, and the bottle can be expected to be exhausted after only a short period of further use.

It is possible to determine the amount of releasable gas still remaining in a bottle of compressed and liquified gas on the basis of weight, if both the weight of the gas charge itself and the initial weight of the gas charge and bottle are known. Because standard sizes of bottles are always charged with a constant amount of gas, if a full bottle is weighed before it is put into service, and then, when a user wishes to know how much gas remains, the bottle is weighed again, the remaining weight of gas can be calculated. This is done by subtracting the known weight of the initial gas charge from the first weighing, thus giving the empty bottle weight, and then the bottle weight is subtracted from the second weighing, giving the weight of the remaining gas. Since the weight of the initial gas charge should always be constant, the procedure would be simplified if the weight of all gas bottles of a certain size were constant, but unfortunately there are significant variations in empty bottle weights, expecially when compared to the weight of the initial gas charge.

The procedure described above is of course not particularly convenient for occasional use by a domestic user of bottled gas, especially when the bottle is located in an enclosure such as in a portable gas fire. The gas bottle has to be weighed before being put into service and the reading noted for later use; then when it is desired to know the amount of gas remaining, the bottle typically will have to be disconnected from the apparatus it feeds, lifted on to a suitable weighing machine and the reading noted and the bottle replaced and reconnected, whereafter the calculation has to be performed. Moreover, not many households have weighing machines suitable for weighing gas bottles, but not infrequently bathroom scales have been pressed into service when a weighing is to be performed.

OBJECTS OF THE INVENTION

It is a prime object of this invention to provide apparatus for use with a gas bottle containing releasable gas, to give an indication of the amount of releasable gas still remaining within the bottle, at any time whilst the bottle is in service.

Another object of this invention is to provide apparatus which is simple and easy to use, both for putting the apparatus into service to determine the content of a gas bottle, and for reading the content from the indication provided by the apparatus.

Yet another object of this invention is to provide apparatus in the form of a readily-portable gauge which can with ease be used in a conventional gas-bottle holder installation without the need to modify said holder, so as always to provide an instantaneous indication of the gas bottle content.

SUMMARY OF THE INVENTION

The foregoing objects as well as further objects which will become apparent from the following are satisfied by apparatus arranged in accordance with this invention, which apparatus comprises frame means, a lifting element mounted on the frame means for movement with respect thereto, a spring acting between said frame means and said lifting element, and an indicator arrangement including a scale and indicator combination one of which scale and indicator is movable relative to the other of said scale and indicator and is coupled to said lifting element for operation thereby on movement of said lifting element, said lifting element being adapted to be engaged with the gas bottle at such a location thereon that movement of said lifting element under the influence of the force exerted by said spring causes the gas bottle to pivot about a point on the lower periphery of the gas bottle, and said indicator arrangement having at least two markings respectively indicative of a full gas bottle and an empty gas bottle, there being adjusting means allowing said indicator of the indicator arrangement to be aligned with the 'full' marking on said scale when said lifting element is engaged with a gas bottle to cause pivoting thereof about said point on the lower periphery of the bottle under the action of said spring.

It will be appreciated that the essential point of this invention is that when using the apparatus a gas bottle is caused to pivot about a point on its lower periphery and from the force required to effect such pivoting, an assessment of the gas bottle content can be determined. The assessment can be performed continuously, whilst the bottle remains in service, and this can be compared with the prior art where the whole bottle and its contents were weighed to determine the content, and this necessitated taking the bottle out-of-service.

BRIEF DESCRIPTION OF THE DRAWINGS

The invention will now be described in greater detail and certain specific embodiments thereof given, reference being made to the accompanying drawings as necessary. In the drawings:

FIG. 1 is a side view, partly cut away, of one form of gauge arranged in accordance with the invention and adapted to be inserted beneath a gas bottle;

FIG. 2 is a front view of the gauge of FIG. 1;

DESCRIPTION OF THE PREFERRED ARRANGEMENTS

The apparatus of this invention can be constructed in a variety of ways. For instance, the apparatus may take the form of a separate independent unit adapted to be inserted into a gas bottle holder between the base thereof and a carried bottle, the lifting element being engaged by the lower edge of the bottle so as to cause the bottle to pivot about a diametrically opposed point. Alternatively, the apparatus could be constructed as an integral part of a gas bottle holder or other equipment including such a holder (for instance, a portable gas fire), so that a gas bottle when inserted in the holder automatically engaged the lifting element to be caused to pivot about a point on its lower periphery. The former design would be suitable for use with existing gas-fired equipment, whereas the latter would lend itself particularly to portable domestic gas fires, for incorporation therein as original equipment.

The indicator arrangement may be associated directly with the lifting element, or may take the form of a remote-reading device, appropriately coupled to respond to movement of the lifting element. For example as shown in FIG. 2, the lifting element may have a pointer attached thereto, which pointer is arranged to traverse a scale appropriately provided on a fixed part of the apparatus and having at least 'full' and 'empty' markings. Because however it is preferred for the range of movement of the lifting element to be maintained small, for the case in which a pointer is employed it is advantageous for the pointer to be coupled to the lifting element by a mechanism which gives an increased pointer movement, as compared with that of the lifting element. For instance, a pointer may be pivoted on a fixed part of the apparatus and coupled to the lifting element by a mechanism which in effect multiplies the movement of the lifting element itself. Another possibility is for the lifting element to move a nut substantially linearly along the length of a threaded rod, whereby the rod is rotated, a pointer being driven by the rod.

Figure 5:
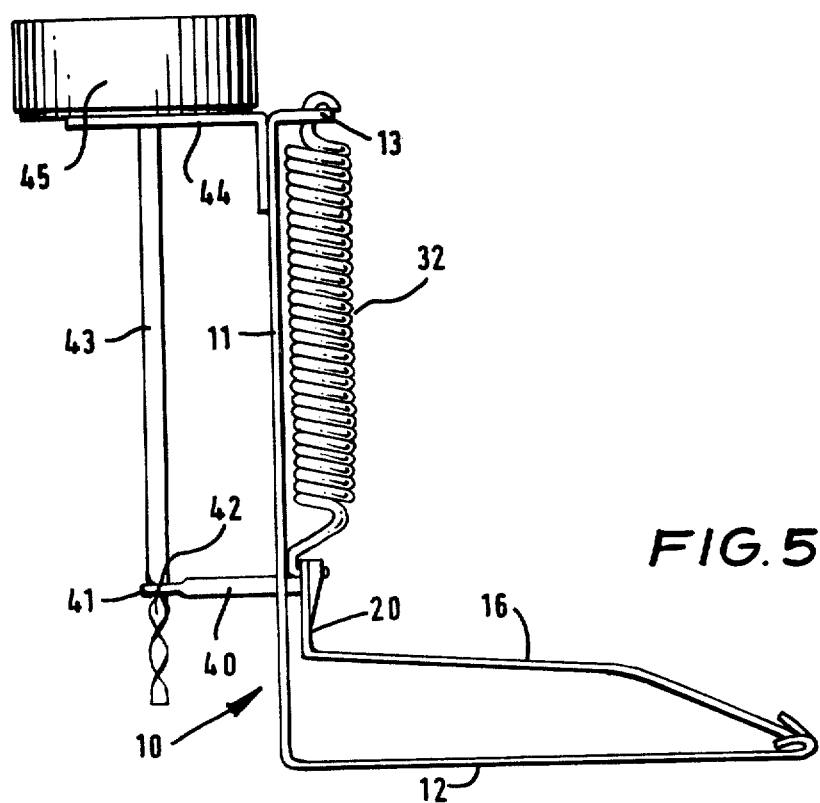
FIG. 5 is a side view of a second form of gauge arranged in accordance with the invention.

Instead of having a movable pointer traversing a fixed scale, the embodiment of FIG. 5 has an indicator arrangement with a movable scale which is traversed past a fixed indicator. In such an arrangement, the indicator may be in the form of a plate defining a window through which the movable scale may be viewed, the marking on the scale visible for the time being through the window giving the required indication.

If a remote-reading indicator arrangement is required, the indicator arrangement may include a shaft or cable drive coupling the lifting element to the indicator arrangement, which may then be disposed at a location convenient for reading. The indicator arrangement itself may however be similar to those described above, but an alternative would be to provide an electrical transducer associated with the lifting element and operable thereby, there being an electric circuit monitoring the operation of the transducer and driving a suitable indicator device, such as an electro-mechanical meter or a digital display arrangement.

The markings on the scale most conveniently comprise coloured regions, the 'empty' markings being colored red, the 'full' marking being coloured green, and if required various appropriate shades being employed between these two markings. In addition, or alternatively, the scale may carry appropriate wording or numeric characters, to give at least the 'full' and 'empty' markings. Moreover, the scale may be calibrated in weight of gas remaining, and/or to given an indication of the amount of time for which the bottle may remain in service, presuming operation of the gas-fired equipment at its maximum rate.

The apparatus of this invention has adjusting means to allow the indicator arrangement to indicate 'full' when a fresh gas bottle is pivoted thereby. This in effect allows the apparatus to be used with gas bottles of similar sizes but of different empty weights, provided the bottles are filled with the same initial weight of charge. Conveniently, the adjusting means may operate either on the spring so as to cause the lifting element to pivot a full gas bottle to an extent sufficient to allow the indicator means to indicate 'full', or directly on the indicator arrangement so as to effect or allow relative adjustment of the indicator or scale thereof such that the indicator arrangement indicates 'full' when the apparatus is used with a full gas bottle. In the former case, it is preferred for the adjusting means to comprise a screw-threaded adjuster acting on the end of the spring remote from that engaged with the lifting element. In the latter case, the scale carrying the markings may be movable relative to a fixed part of the apparatus, for adjustment purposes, and hence also relative to the indicator thereby to permit proper alignment of the 'full' marking when the apparatus is used with a full gas bottle. Another possibility is for the indicator itself of the indicator arrangement to be adjustable relative to the lifting element, and hence to the scale, for a given position of the lifting element.

For the case where the apparatus is intended to be a separate unit usable for instance in connection with existing equipment such as a portable domestic gas fire, it is preferred for the lifting element to be in the form of a platform pivoted about one edge to a frame and spring biased upwardly, the platform being connected to the indicator arrangement whereby the pivotal movement of the platform is registered by the indicator arrangement when the apparatus is inserted under a gas bottle such that a point on the lower peripheral edge of the bottle rests on the platform and a diametrically opposed point on the periphery thereof rests on a support for the bottle. The frame and/or platform are preferably configured to provide an abutment limiting the insertion of the apparatus beneath a gas bottle, whereby the apparatus may consistently be disposed at the same position relative to a bottle each time it is inserted therebeneath, to ensure consistent and reliable readings.

As mentioned above, the apparatus of this invention may be incorporated into equipment to form an integral part thereof. In such a case, no separate special frame need be provided to carry the lifting element, nor to carry the indicator arrangement. The principle of operation may however be the same as that for a separate independent unit, and thus may have a lifting element in the form of a platform which is pivotally mounted and spring-biassed to support a gas bottle by one point on the lower periphery thereof. An alternative arrangement is to have a lifting element which is slidable generally vertically and having a portion adapted to engage a gas bottle beneath the lower periphery thereof, the element being spring-urged upwardly so as to be able to effect pivotal movement of the bottle about a diametrically-opposed point on its periphery. Yet another possibility is for the lifting element to be pivotally or slidably movable generally horizontal and adapted to engage a point on the cylindrical surface of the bottle spaced upwardly from the lower edge thereof, so that a horizontal force may be exerted on the bottle to pivot the bottle about a point on its lower periphery opposed to that point engaged by the lifting element. Thus, the lifting element may be in the form of a plunger adapted to be slidable generally horizontally towards and away from a gas bottle and spring urged towards the bottle, whereby the plunger may engage the cylindrical surface of the gas bottle remote from the lower periphery thereof, to effect pivoting thereof. Such arrangements may particularly be suitable for incorporation in apparatus having a gas bottle holder which fits relatively closely around the bottle, such as in a portable domestic fire, or in a carrier for a gas bottle provided for example on a caravan or boat.

Whatever configuration the apparatus of this invention takes, it is preferred for the range of pivotal movement of the gas bottle about said point on its lower periphery, from the bottle being full to the bottle being empty, to be relatively small, and moreover it is preferred for the gas bottle to be supported by the lifting element such that when the bottle is full, its axis is substantially vertical, or at a relatively small angle to the vertical. In this way, stability of the bottle can be ensured, calibration difficulties owing to the bottle being out of vertical can largely be ignored, and no extra space need be provided in a typical gas bottle holder, to allow for the pivotal movement of the bottle. The apparatus may fulfill such conditions by having a spring with a relatively large spring rate, and by providing an end stop for movement of the lifting element under the action of the spring, such that the spring is pre-stressed as fitted to exert a force on the lifting element to hold the element against the end stop, which force is only slightly less than that exerted on the lifting element by an empty gas bottle.

Figure 3:
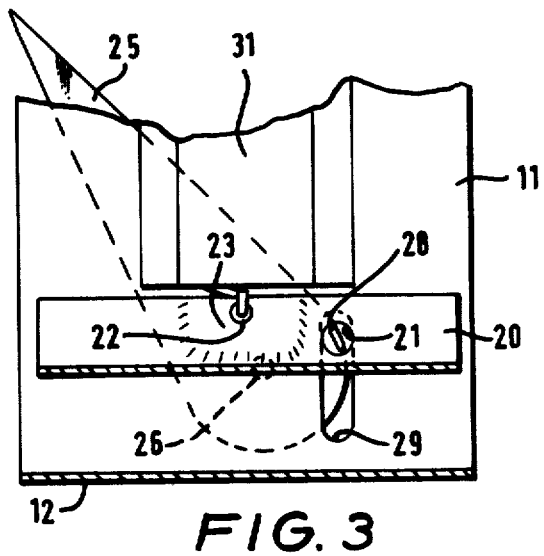
FIG. 3 is a partial view of a cross-section along line A—A of FIG. 1.

Turning now to the drawings, FIGS. 1 to 3 show in detail an embodiment of the apparatus incorporating certain of the preferred aspects of the invention as described above. This embodiment of gauge comprises an L-shaped frame 10 of sheet metal, having an upright portion 11 and a base portion 12. The upright portion 11 is bent over at its upper extremity to form an upper flange 13, and the base portion 12 at its end remote from the upright portion 11 is bent back on itself to form a lip 14, beneath which an edge 15 of a platform 16 is accommodated. The platform 16 has a width slightly less than that of the base portion 12, and at the extremes of the lip 14 to each side of the base portion the lip is cut and bent to form tabs 17, which restrain sideways movement of the platform to either side, whilst allowing the platform to perform a hinging movement.

The platform 16 has a first portion 18 which normally lies generally horizontal or slightly inclined, and a second portion 19 disposed downwardly away from the first portion, the edge 15 being defined at the free end of the second portion 19. At the edge of the platform nearest the frame upright portion 11 there is an upstanding flange 20 which includes a through-hole 21 offset from the centre-line of the flange and another through-hole 22 disposed on said centre-line. In the region 23 of the hole 22 the flange 20 is deformed to bulge away from the frame upright portion 11.

The front face of the frame upright portion 11 carries a pointer 25 on a pivot pin 26, held on the pin by a domed cap 27. On one edge of the pointer 25, and towards its lower end, the pointer has a lug 28 which projects through a slot 29 in the frame upright portion 11 and thence through the hole 21 in the flange 20 of the platform 16. On the rear face of the frame upright portion 11 there is a housing 31 of semi-circular cross-section in which is located a spring 32 the top end of which is hooked into the eye of an eye-bolt 33. The bolt 33 passes through a hole in the upper flange 13 and carries a hexagonal adjuster nut 34. At its other end the spring 32 is hooked into hole 22 in the flange 20.

The part of the frame upright portion 11 over which the upper end of the pointer 25 sweeps is appropriately marked (FIG. 2), to indicate at least 'full' and 'empty' at the two extremes respectively of pointer movement, but further intermediate markings may also be given. The markings may take the form of coloured regions, or of numerals or words, as appropriate.

The spring rate of the spring 32 is chosen having regard to the bottle size with which the gauge is to be used, and the adjuster nut 34 allows the spring 32 to be pre-tensioned to an extent sufficient for the pointer to be aligned with the 'full' marking on the scale when the gauge is appropriately positioned beneath a freshly-charged gas bottle. Despite the pre-loading of the spring, the platform is restrained against upward movement by the flange 20 engaging the housing 31.

Figure 4:
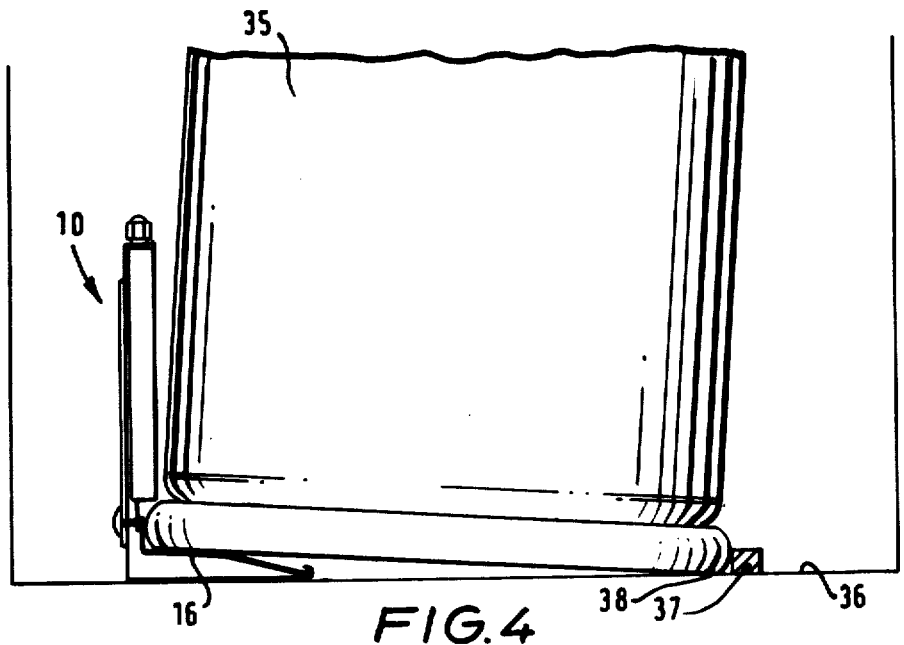
FIG. 4 is a diagrammatic sketch of the gauge of FIGS. 1 to 3 being used with a gas bottle.

FIG. 4 shows the gauge in use with a gas bottle 35, located in a housing including a base wall 36, for instance of a portable gas fire. The bottle 35 is positioned with its lower periphery in engagement with an abutment 37 and the gauge is inserted beneath the lower periphery of the bottle as far as possible, at a position diametrically-opposed to the abutment 37. The bottle 35 thus pivots about point 38, the diametrically-opposed point being supported by the platform 16 which moves against the bias provided by spring 32 to an extent proportional to the force exerted by the bottle on the platform.

To use the gauge, it is positioned in the manner described beneath a full gas bottle, and the adjuster nut 34 is turned until the pointer 25 indicates 'full'. Thereafter, as gas is used, the pointer will move across the scale until, when the bottle is empty, the pointer is aligned with the corresponding marking on the scale.

Once calibrated for a particular bottle, the gauge need not be left beneath the gas bottle. For instance, in the case of a caravan the gauge may be inserted beneath a bottle carried in the usual manner on the caravan tow-bar only when a reading actually is required, the bottle being loosened for this purpose but at other times being securely clamped against movement.

The specific form of gauge described above may be modified by replacing the single tension spring 32 with one or more compression springs, located between the platform 16 and the frame base portion 12. The housing 31 and adjuster nut may then be omitted, but adjustment or the gauge when placed beneath a full gas bottle may instead be achieved by having a movable scale mounted on the frame 10.

Figure 6:
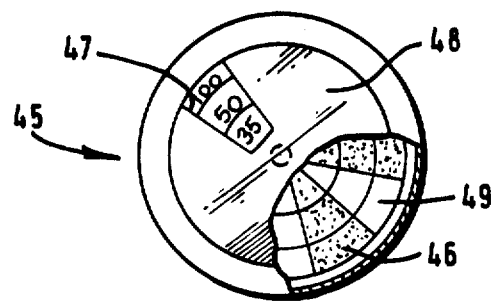
FIG. 6 is a top view of the indicator of the gauge of FIG. 5.

Referring to FIGS. 5 and 6, there is shown a second embodiment of gauge generally similar to that of FIGS. 1 to 3: like parts are given like reference characters and will not be described again. A rod 40 extends through hole 21 in the flange 20 and is riveted thereto so as to extend through slot 29 in the frame upright portion 11. The free end of the rod 40 is flattened and has a generally rectangular slot therein, to define a rudimentary nut 41 co-operable with a coarse thread 42 formed on a shaft 43 journalled in a plate 44 projecting from the frame upright portion 11. The plate 44 carries an indicator arrangement 45 operated by the shaft 43, which arrangement may comprise an indicator disc 46 (FIG. 6) mounted on the shaft 43, a part of which is visible through a window 47 in the top member 48 of the arrangement. The disc 46 may be marked in segments 49 suitably sub-divided and carrying quantitative numerical calibrations, or the disc may be appropriately coloured.

An alternative is for the shaft to drive a pointer which may traverse a scale provided on the top member 48 of the indicator arrangement 45. In either case, adjustment of the gauge to indicate 'full' with a freshly-charged gas bottle may be effected by rotating the top member 48 relative to the plate 44 and hence to the indicator component driven by the shaft 43.

In this second embodiment, because adjustment is provided for the indicator arrangement itself, there is no need to provide an adjuster arrangement for tensioning the spring 32. The gauge is used in essentially the same manner as described above with reference to FIG. 4, except that initial calibration is performed by relative rotation of the top member 48 of the indicator arrangement, rather than by turning the nut 34 of the first embodiment. Thereafter, movement of the platform 16 as gas is released from the bottle causes the nut 41 of pin 40 to be driven axially along shaft 43 thereby turning the shaft to give a different reading on the indicator arrangement. In the form of indicator arrangement shown, the disc 46 is calibrated in the number of hours of burning time left for 1 set, 2 sets or 3 sets of burners of a portable gas fire.

Either of the forms of gauge described above may be constructed integrally with a complete piece of gas-fired equipment, and for the second embodiment, the shaft 43 may be elongated as necessary to allow the indicator arrangement to be positioned at a convenient location.

Figure 7:
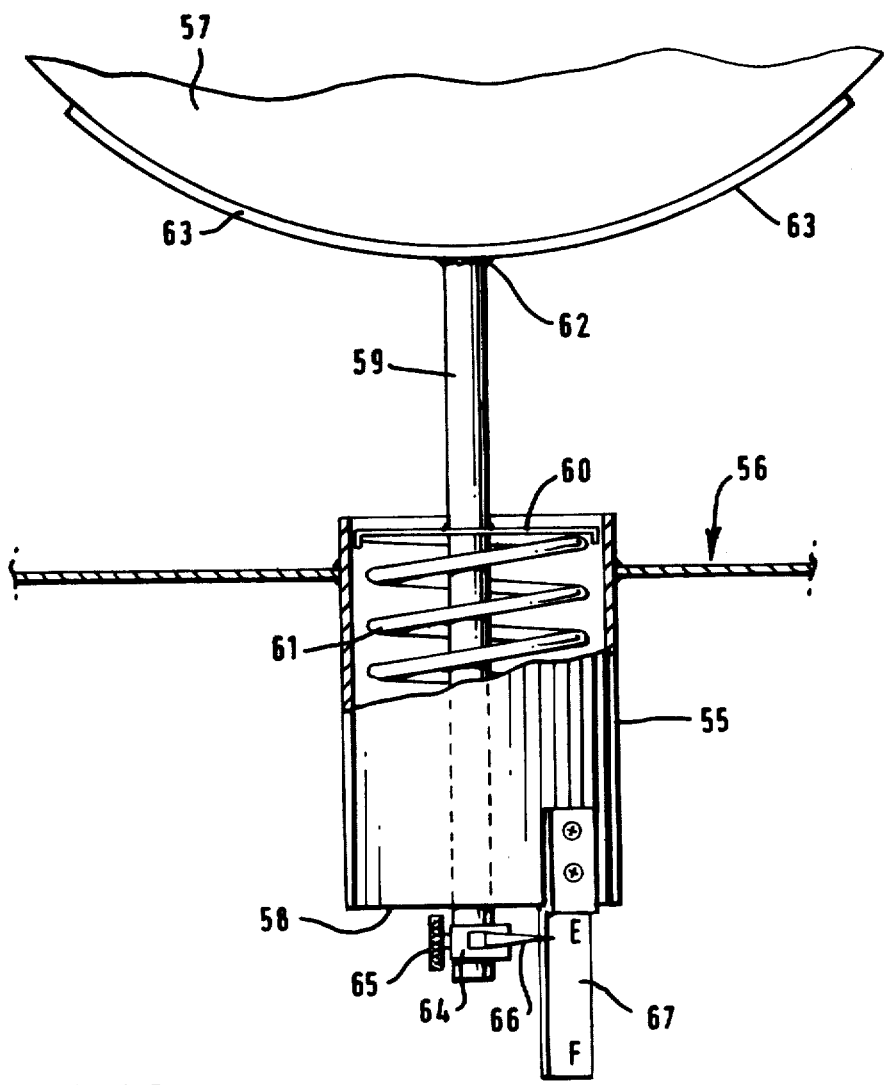
FIG. 7 is a diagrammatic plan view of a third embodiment of gauge of this invention.

FIG. 7 shows a third embodiment of bottle gauge of this invention and constructed as an integral part of a gas bottle holder of, for instance, a portable gasfire. The gauge includes a tube 55 fitted into a side wall 56 of the bottle housing, so that the tube axis extends generally horizontally at a position typically at two-thirds of the height of a gas bottle 57. The tube is closed at one end 58, and a rod 59 is slidably supported co-axially therewithin, the rod passing through a hole in the closed end 60 and having a circular plate 60 affixed thereto for sliding within the tube. Acting between the closed end of the tube and the plate 60 is a compression spring 61.

The end 62 of the rod within the gas bottle housing has a pair of arms 63 affixed thereto, for engaging the cylindrical wall of the gas bottle itself. An adjustable screw-threaded clamp 64 is fitted on the other end of the rod, the clamp having a knob 65 by means of which the clamp can be released or tightened to the rod and also carrying a pointer 66 which traverses a scale 67 mounted on the tube 55.

The above-described arrangement functions in a generally similar manner to the first two described embodiments, but applies a force to the side of a gas bottle to effect pivoting thereof, rather than to the lower periphery. A full bottle is inserted in the holder up to an abutment (not shown) and is rested against the arms 63. The spring 61 is thus compressed to a certain extent and the pointer of the screw-threaded clamp is aligned against the 'F' (i.e. full) marking. Thereafter, on gas being used, the force required to maintain the bottle in the pivoted state falls and the reading of the pointer against the scale falls correspondingly.

I claim:

1. Apparatus for assessing the amount of releasable gas in a bottle of compressed gas resting on a support therefor, which apparatus comprises frame means, a lifting element mounted on the frame means for movement with respect thereto, a spring acting between said frame means and said lifting element, and an indicator arrangement including a scale and indicator combination one of which scale and indicator is movable relative to the other of said scale and indicator and is coupled to said lifting element for operation thereby on movement of said lifting element, said lifting element being adapted to be engaged with the gas bottle at such a location thereon that movement of said lifting element under the influence of the force exerted by said spring causes the gas bottle to pivot about a point on the lower periphery of the gas bottle, and said indicator arrangement having at least two markings respectively indicative of a full gas bottle and an empty bottle, there being adjusting means allowing said indicator of the indicator arrangement to be aligned with the 'full' marking on said scale when said lifting element is engaged with a gas bottle to cause pivoting thereof about said point on the lower periphery of the bottle under the action of said spring.

2. Apparatus according to claim 1, in which said adjusting means operates on the spring to effect preloading thereof, thereby to cause said lifting element to pivot a full gas bottle to an extent sufficient to allow the indicator means to indicate said 'full' marking.

3. Apparatus according to claim 1, in which said adjusting means operates on said indicator arrangement to allow relative movement of said co-operating indicator and scale combination, thereby to cause said indicator arrangement to indicate said 'full' marking when said apparatus is used with a full gas bottle.

4. Apparatus according to claim 1, in which the frame means supports said lifting element for sliding movement in a generally horizontal direction, and said lifting element is adapted to engage the cylindrical surface of the gas bottle spaced upwardly from the lower edge of the gas bottle, said spring urging said lifting element for horizontal movement thereby to exert a horizontal force on a gas bottle so as to pivot the bottle about a point on its lower periphery opposed to the point of action of said lifting element.

5. Apparatus according to claim 1, in which there is an end stop to limit the movement of the lifting element under the action of said spring, and said spring is pre-stressed so as to exert a force on the lifting element which holds said element against the end stop, said spring force being less than the force exerted on the lifting element when the apparatus is used with an empty gas bottle.

6. Apparatus according to claim 1, in which said frame means defines a base portion and an upright portion connected to said base portion, said lifting element being mounted on said base portion and said indicator arrangement being carried on said upright portion, the frame means forming an independent unit to allow the apparatus to be inserted into a gas bottle holder between the base thereof and a point on the periphery of a carried bottle, said lifting element then being engaged by said point on the periphery of the lower edge of a held bottle so as to cause the bottle to pivot about a diametrically-opposed point.

7. Apparatus according to claim 6, in which one of said frame and said platform is configured to provide an abutment limiting the insertion of the apparatus beneath a gas bottle, whereby the apparatus may consistently be disposed at the same position relative to a gas bottle each time said apparatus is inserted therebeneath.

8. Apparatus according to claim 6, in which there is provided a mechanism connecting said lifting element to a pointer forming said indicator, which mechanism gives an increased pointer movement as compared with the movement of said lifting element, and said scale provided with at least 'full' and 'empty' markings being disposed on said frame means at such a location that said pointer may sweep thereacross.

9. Apparatus according to claim 8, in which said mechanism comprises a nut and threaded rod, said nut being mounted on said lifting element for substantially linear movement along the length of said threaded rod, and said rod is connected to the indicator to cause turning movement thereof.

10. Apparatus according to claim 9, in which said indicator arrangement comprises a movable scale and a plate defining a window through which the movable scale may be viewed, the marking on the scale visible for the time being through the window giving the required indication.

11. Apparatus for assessing the amount of releasable gas in a bottle of compressed gas resting on a support therefor, which apparatus comprises frame means including a base portion and an upright portion, a lifting element pivoted to said base portion, a spring acting between said lifting element and said frame means to urge said lifting element to pivot upwardly, a screw-threaded adjuster provided at the connection between said spring and the frame means to allow adjustment of the force exerted by said spring on said lifting element, a scale marked on said upright portion of the frame means and having at least 'full' and 'empty' markings, a portion pivoted to said frame means to sweep across said scale, and a mechanism connecting said pointer to said lifting element to cause said pointer to sweep across said scale on movement of said lifting element, there being an abutment on said lifting element to limit the extent to which the apparatus can be inserted beneath a gas bottle with a point on the lower periphery of said bottle resting on said lifting element and a diametrically-opposed point on the lower periphery of the gas bottle serving as a fulcrum about which the bottle is pivoted, and said screw-threaded adjuster allowing the pointer to be aligned with the 'full' marking on said scale when the apparatus is inserted as aforesaid beneath a full gas bottle.

12. A method of assessing the amount of releasable gas in a bottle of compressed gas resting on a surface by using apparatus including a spring-urged lifting element, and an indicator arrangement operatively coupled to said lifting element to indicate the instantaneous position thereof, the indicator arrangement having at least 'full' and 'empty' markings, which method comprises the steps of positioning said apparatus relative to a full gas bottle so that said lifting element is in engagement with the bottle and the action of the spring on said lifting element causes the bottle to pivot about a point on the lower periphery thereof, calibrating said indicator arrangement so that a 'full' indication is given thereby, and thereafter on gas being released from the bottle assessing the amount of releasable gas remaining from the instantaneous indication provided by said indicator arrangement operated by said lifting element still effecting pivoting of the bottle about said point on the lower periphery thereof.

* * * * *